(12) United States Patent
Mochizuki

(10) Patent No.: US 12,393,051 B2
(45) Date of Patent: Aug. 19, 2025

(54) AERIAL DISPLAY APPARATUS

(71) Applicant: MURAKAMI CORPORATION, Shizuoka (JP)

(72) Inventor: Takayoshi Mochizuki, Shizuoka (JP)

(73) Assignee: MURAKAMI CORPORATION, Shizuoka (JP)

( * ) Notice: Subject to any disclaimer, the term of this patent is extended or adjusted under 35 U.S.C. 154(b) by 362 days.

(21) Appl. No.: 18/031,700

(22) PCT Filed: Sep. 17, 2021

(86) PCT No.: PCT/JP2021/034391
§ 371 (c)(1),
(2) Date: Apr. 13, 2023

(87) PCT Pub. No.: WO2022/085346
PCT Pub. Date: Apr. 28, 2022

(65) Prior Publication Data
US 2023/0384615 A1  Nov. 30, 2023

(30) Foreign Application Priority Data

Oct. 20, 2020 (JP) .................................. 2020-176011

(51) Int. Cl.
*G02B 30/56* (2020.01)
*G03B 21/10* (2006.01)
*G03B 21/20* (2006.01)

(52) U.S. Cl.
CPC ............. *G02B 30/56* (2020.01); *G03B 21/10* (2013.01); *G03B 21/2006* (2013.01); *G03B 21/2066* (2013.01)

(58) Field of Classification Search
CPC .... G02B 30/56; G03B 21/10; G03B 21/2006; G03B 21/2066
See application file for complete search history.

(56) References Cited

U.S. PATENT DOCUMENTS

2019/0179160 A1\* 6/2019 Ito ..................... G02B 26/0816
2019/0391405 A1  12/2019 Takechi et al.

FOREIGN PATENT DOCUMENTS

JP  2015-69572    4/2015
JP  2016-154035   8/2016
(Continued)

OTHER PUBLICATIONS

International Search Report issued in International Bureau of WIPO Patent Application No. PCT/JP2021/034391, dated Dec. 7, 2021, along with an English translation thereof.
(Continued)

*Primary Examiner* — James A Dudek
(74) *Attorney, Agent, or Firm* — Greenblum & Bernstein, P.L.C.

(57) ABSTRACT

An aerial display apparatus according to one embodiment is an aerial display apparatus displaying a virtual image in the air. The aerial display apparatus includes: a display apparatus irradiating with light to display information; a retroreflective member reflecting the light from the display apparatus multiple times to display a virtual image in the air; an infrared-ray transmission/reception unit transmitting and receiving infrared rays used as data through the retroreflective member; a control unit transmitting and receiving a control signal to and from each of the display apparatus and the infrared-ray transmission/reception unit; and a housing accommodating the display apparatus and the infrared-ray transmission/reception unit. The retroreflective member is mounted on an opening formed in the housing, and the display apparatus and the infrared-ray transmission/reception unit are arranged inside the housing.

5 Claims, 9 Drawing Sheets

(56) References Cited

FOREIGN PATENT DOCUMENTS

| JP | 2018-146965 | 9/2018 |
|----|-------------|--------|
| JP | 2019-105744 | 6/2019 |

OTHER PUBLICATIONS

International Preliminary Report on Patentability issued in International Bureau of WIPO Patent Application No. PCT/JP2021/034391, dated May 4, 2023, along with an English translation thereof.

* cited by examiner

AERIAL DISPLAY APPARATUS

TECHNICAL FIELD

The present disclosure relates to an aerial display apparatus that displays a virtual image.

This application is based upon and claims the benefit of priority from Japanese Patent Application No. 2020-176011, filed on Oct. 20, 2020, and incorporates all the content described in the Japanese Patent Application.

BACKGROUND ART

In the related art, various types of display apparatuses that display virtual images in the air are known. Japanese Unexamined Patent Publication No. 2016-154035 discloses a non-contact input device having a display with an optical sensor. A non-contact input device includes a flat display and an optical imaging unit receiving light of an image displayed on the display and forming the image on the display as a first real image. The optical imaging unit forms the image at a symmetrical position on the display.

A finger touches the first real image formed by the optical imaging unit. When the finger touches the real image, the finger is irradiated with the infrared rays from the display. Reflected light from the finger forms a second real image on the display through the optical imaging unit. An infrared-ray sensor is built in the display. By optically detecting a position of the second real image with the infrared-ray sensor, it is recognized which portion of the first real image the finger has pressed.

CITATION LIST

Patent Literature

Patent Literature 1: Japanese Unexamined Patent Publication No. 2016-154035

SUMMARY OF INVENTION

Technical Problem

By the way, when the infrared rays are transmitted and received for purposes other than sensing such as finger detection, and when an infrared-ray transmission/reception unit transmitting and receiving the infrared rays is arranged inside the housing, a window for transmitting and receiving the infrared rays may need to be separately provided in the housing. In this manner, when the infrared rays are transmitted and received for purposes other than the sensing, there may be a need to separately form a window in the housing. Therefore, there is room for improvement in terms of the design of the housing and the cost required to manufacture the housing.

An object of the present disclosure is to provide an aerial display apparatus capable of suppressing deterioration in terms of design of a housing and suppressing an increase in the cost of manufacturing the housing.

Solution to Problem

An aerial display apparatus according to the present disclosure is an aerial display apparatus that displays a virtual image in the air. The aerial display apparatus includes: a display apparatus irradiating with light to display information; a retroreflective member reflecting the light from the display apparatus multiple times to display a virtual image in the air; an infrared-ray transmission/reception unit transmitting and receiving infrared rays used as data through the retroreflective member; a control unit transmitting and receiving a control signal to and from each of the display apparatus and the infrared-ray transmission/reception unit; and a housing accommodating the display apparatus and the infrared-ray transmission/reception unit. The retroreflective member is mounted on an opening formed in the housing, and the display apparatus and the infrared-ray transmission/reception unit are arranged inside the housing.

In this aerial display apparatus, the display apparatus displays a virtual image in the air by irradiating the retroreflective member with light, and the infrared-ray transmission/reception unit transmits and receives infrared rays used as data through the retroreflective member. The display apparatus and the infrared-ray transmission/reception unit are arranged inside the housing, and the retroreflective member is mounted on an opening of the housing. Therefore, the display apparatus that displays information by irradiating with light and the infrared-ray transmission/reception unit that transmits and receives the infrared rays for data communication can share the retroreflective member mounted on the opening of the housing. That is, the retroreflective member can be shared both for displaying a virtual image on the display apparatus and for transmitting and receiving the infrared rays. Therefore, since there is no need to form a window in the housing separately from the opening, the design of the housing can be simplified, and an increase in the cost of manufacturing the housing can be suppressed. By installing a control unit transmitting and receiving the control signals to and from each of the display apparatus and the infrared-ray transmission/reception unit, the display of the virtual image by the display apparatus and the transmission and reception of data by the infrared-ray transmission/reception unit can be allowed to be linked.

The retroreflective member may display a display surface attached with a switch as a virtual image and may include a sensor that detects a position of a target object approaching the switch and a determination unit that determines based on a position of the target object detected by the sensor whether the switch is operated. In this case, the display apparatus displays the display surface attached with the switch as a virtual image, and the sensor detects the position of the target object such as a finger approaching the switch. The determination unit determines based on the position of the target object whether the switch is operated. Therefore, since it can be determined whether the switch is operated by displaying the switch as a virtual image in the air, the transmission and reception of the infrared rays can be performed by the infrared-ray transmission/reception unit in linkage with the operation of the switch.

When the determination unit determines that the switch is operated, the infrared-ray transmission/reception unit may transmit the infrared rays used as data through the retroreflective member. In this case, since the infrared rays as data are transmitted when the determination unit determines that the switch is operated, the operation of the switch and the irradiation with the infrared rays can be linked.

The infrared-ray transmission/reception unit may irradiate with the infrared rays used as data through the retroreflective member, and may include a switching unit switching a direction in which the infrared-ray transmission/reception unit irradiates with the infrared rays. In this case, the direction of the infrared rays transmitted by the infrared-ray transmission/reception unit can be switched to a desired direction by the switching unit.

The infrared-ray transmission/reception unit may transmit the infrared rays as an infrared-ray remote control code for operating an external device located outside the aerial display apparatus. In this case, the display of the virtual image by the display apparatus and the transmission of the infrared-ray remote control code can be allowed to be linked, and the external device can be operated by the transmission of the infrared-ray remote control code.

Advantageous Effects of Invention

According to the present disclosure, it is possible to suppress deterioration in the design of the housing and suppress an increase in the cost of manufacturing the housing.

DESCRIPTION OF EMBODIMENTS

Figure 1:
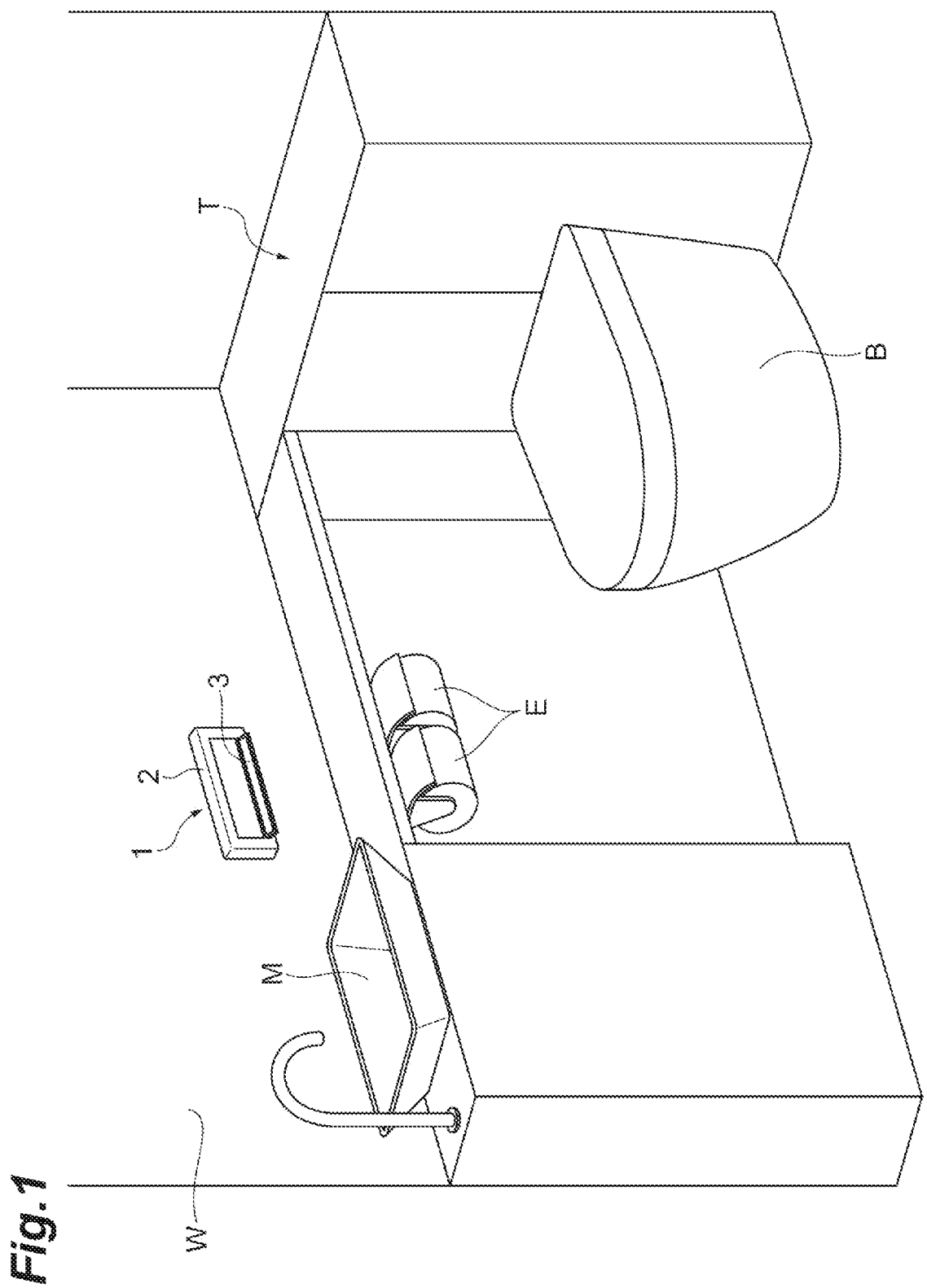
FIG. 1 is a perspective view illustrating an example of toilet in which an aerial display apparatus according to an embodiment is installed.

An embodiment of an aerial display apparatus according to the present disclosure will be described below with reference to the drawings. In the description of the drawings, the same or corresponding elements are denoted by the same reference numerals, and redundant descriptions are omitted as appropriate. The drawings may be partially simplified or exaggerated for the ease of understanding, and dimensional ratios, angles, and the like are not limited to those described in the drawings.

Figure 2:
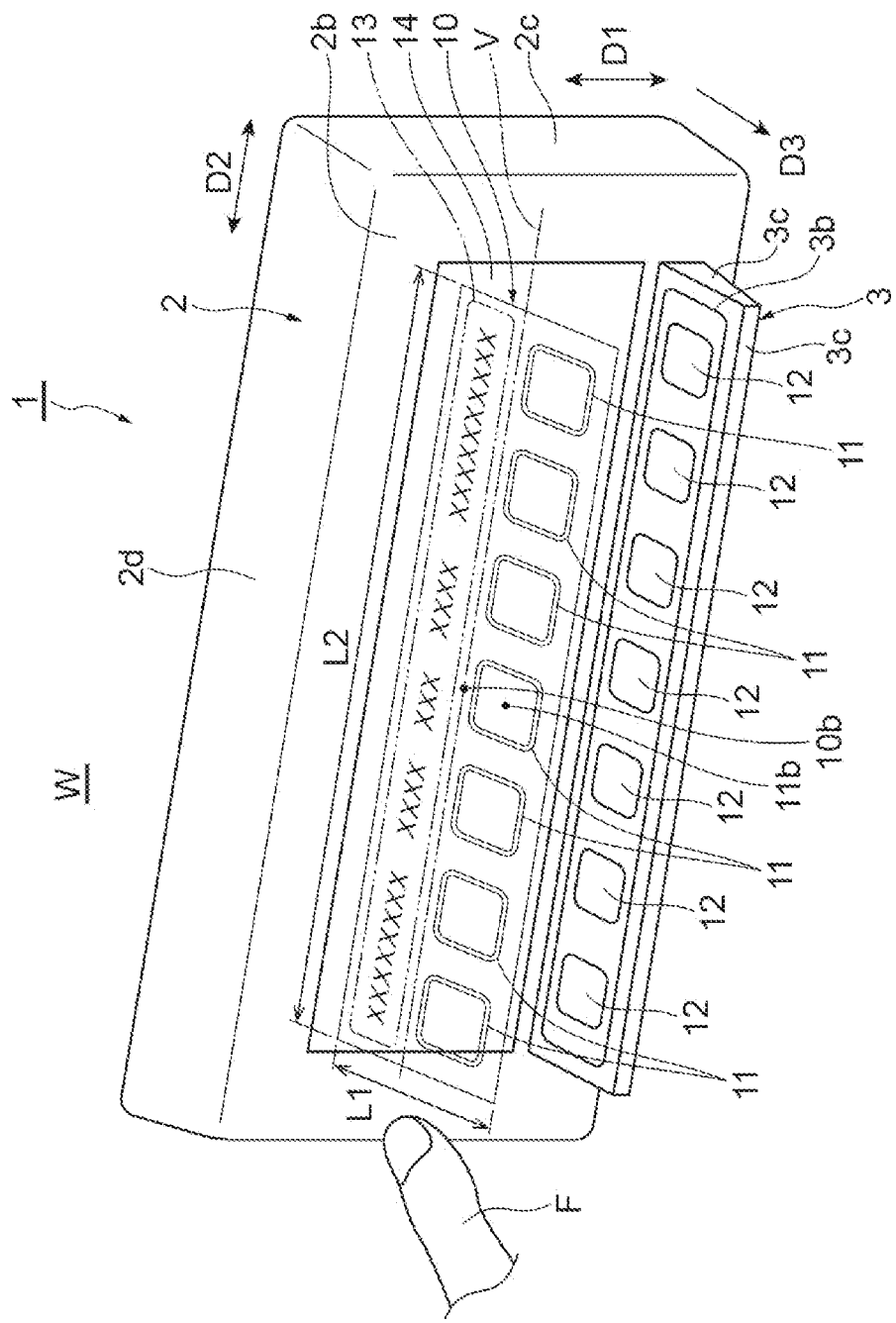
FIG. 2 is a perspective view illustrating a state in which the aerial display apparatus according to the embodiment displays a display surface attached with a switch.

FIG. 1 is a perspective view illustrating an aerial display apparatus 1 as an example according to this embodiment. FIG. 2 is a perspective view illustrating a state in which the aerial display apparatus 1 displays a display surface 10 with a switch 11 in the air. For example, the aerial display apparatus 1 according to this embodiment is an operation input device for operating an apparatus.

As an example, the aerial display apparatus 1 is provided in a toilet T, and the switch 11 on the display surface 10 is a switch operating each portion of the toilet T. The display surface 10 attached with the switch 11 is an aerial floating image displayed in the air. The display surface 10 attached with the switch 11 is displayed as a virtual image in the air. Since the operator does not need to directly touch buttons or the like, it is possible to operate each portion of the toilet T hygienically.

For example, the toilet T includes a toilet bowl B and a wall portion W adjacent to the toilet bowl B. For example, the wall portion W is provided on the right side when viewed from the operator seated on the toilet bowl B. The aerial display apparatus 1 and a toilet paper E are fixed to the example of wall portion W, and the example of wall portion W may be provided with a washstand M. The toilet bowl B is attached with, for example, a washlet (registered trademark). A washlet of the toilet T can be operated from the switch 11 on the display surface 10. For example, the display surface 10 includes a plurality of switches 11. An operator can operate each portion of the washlet by operating the plurality of switches 11.

The aerial display apparatus 1 is fixed to, for example, the wall portion W. The aerial display apparatus 1 may be buried in the wall portion W or may be detachable from the wall portion W. An example of aerial display apparatus 1 includes a housing 2 and a projecting portion 3 protruding from the lower portion of the housing 2. A plurality of sensors 12 detecting a target object F approaching the switch 11 are buried in the projecting portion 3.

In the present disclosure, the "target object" indicates an object that operates the switch 11 to operate the device and indicates, for example, an operator's finger. The sensor 12 is provided corresponding to the switch 11. Each switch 11 is displayed obliquely above each sensor 12. As an example, the number of switches 11 and sensors 12 is seven.

The display surface 10 is displayed so as to be oriented obliquely upward with respect to both an up-down direction D1 of the aerial display apparatus 1 and a projecting direction D3 from the wall portion W. Accordingly, it is easier for the operator to visually recognize the display surface 10. For example, since the display surface 10 is illuminated with light, the display surface 10 can be easily and visually recognized regardless of the brightness of the surroundings. The display surface 10 has, for example, a shape elongated in a left-right direction D2.

As an example, the display surface 10 is displayed in a rectangular shape. A vertical length L1 of the display surface 10 is shorter than a horizontal length L2 of the display surface 10. Assuming that the aspect ratio of the length L1 and the length L2 is 1:X (where X is a real number), the value of X is, for example, 2 or more and 10 or less. The lower limit of the value of X may be 3, and the upper limit of the value of X may be 5, 6, 7, 8, or 9.

As an example, the above value of X may be 4, and the aspect ratio of the length L1 and the length L2 may be 1:4. The switch 11 has, for example, a rectangular shape. As an example, the switch 11 may have a square shape. The length of one side of the switch 11 is, for example, 18 mm or more and 24 mm or less. However, the shape and size of the switch 11 can be changed as appropriate.

The display surface 10 may display other than the plurality of switches 11. For example, the display surface 10 may include a plurality of switches 11 and character information 13. The character information 13 may include, as an example, at least one of date information, time information, atmospheric temperature information, temperature information, and atmospheric pressure information.

On the display surface 10, for example, a plurality of switches 11 may be displayed to be aligned in a horizontal direction on the lower side of the display surface 10, and the character information 13 may be displayed above the plurality of switches 11. The switch 11 may be arranged so that a center 11b is located at a position deviated from a center 10b of the display surface 10. As an example, each of the plurality of switches 11 is displayed at a position offset from a reference line V passing through the center 10b and extending in the longitudinal direction (horizontal direction) of the display surface 10.

Figure 3:
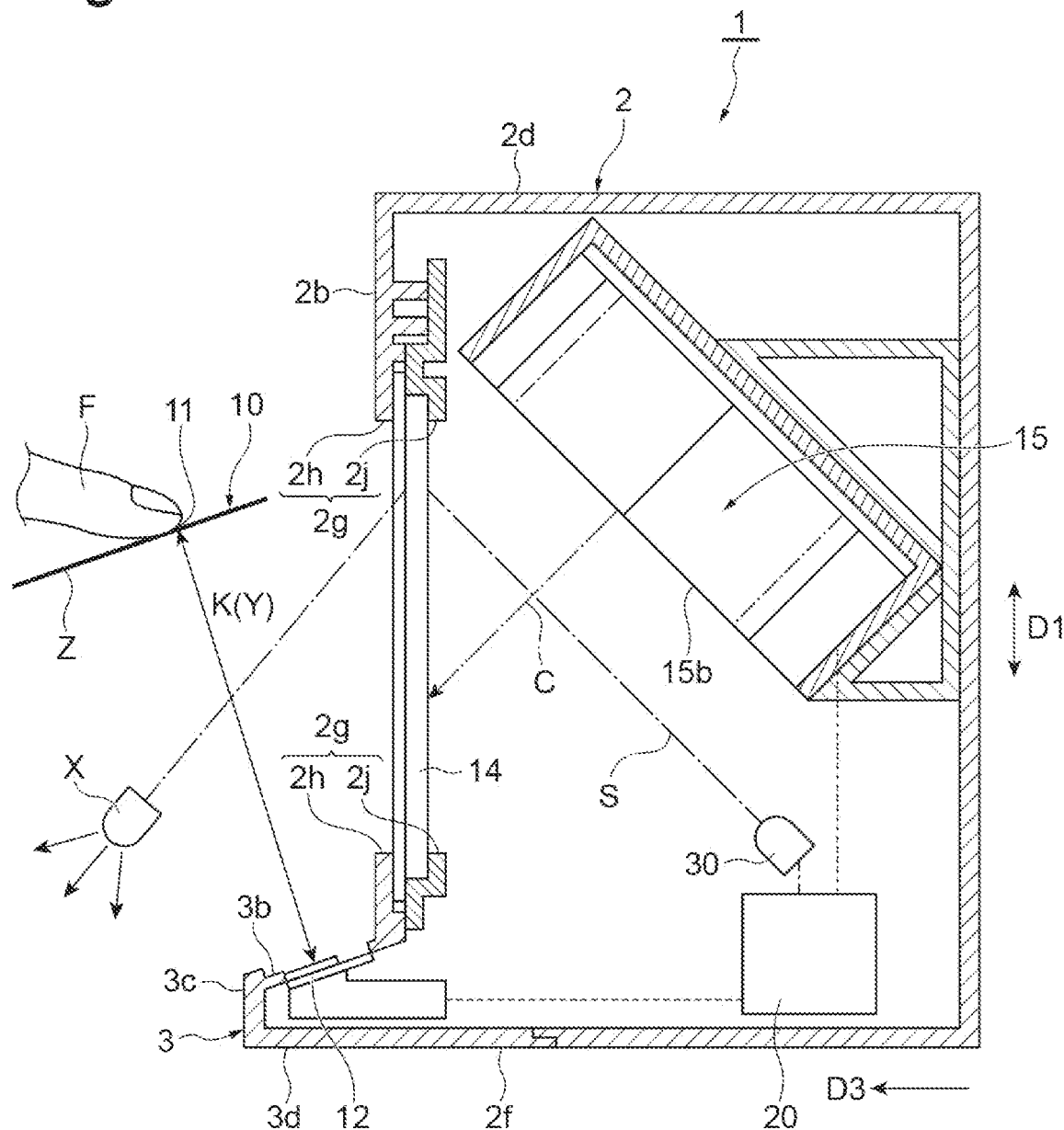
FIG. 3 is a longitudinal sectional view of the aerial display apparatus according to the embodiment.

FIG. 3 is a vertical cross-sectional view illustrating an example of housing 2 and projecting portion 3. As illustrated in FIGS. 2 and 3, for example, the housing 2 has a box shape extending horizontally. As an example, the housing 2 has a front surface 2b, a pair of right and left side surfaces 2c, an upper surface 2d, and a lower surface 2E The front surface 2b extends in the up-down direction D1 and the left-right direction D2 in a state of being mounted on the wall portion W. The side surface 2c extends in the up-down direction D1 and the projecting direction D3 from the wall portion W. The upper surface 2d extends in the left-right direction D2 and the projecting direction D3. The lower surface 2f faces the opposite side of the upper surface 2d.

The projecting portion 3 has, for example, a rectangular plate shape. As an example, the projecting portion 3 has a main surface 3b that protrudes from the lower side of the front surface 2b and faces upward, an end surface 3c that faces in the left-right direction D2 or the projecting direction D3, and a back surface 3d that faces the opposite side of the main surface 3b. As described above, the sensor 12 is built in the projecting portion 3. Accordingly, it is easier for the sensor 12 to detect the target object F.

The aerial display apparatus 1 includes a retroreflective member 14 displaying the display surface 10 attached with the switch 11, a display apparatus 15 arranged inside the housing 2, a control unit 20, and an infrared-ray transmission/reception unit 30 transmitting and receiving the infrared rays S used as data. The infrared-ray transmission/reception unit 30 is, for example, an infrared-ray LED.

As an example, the infrared-ray transmission/reception unit 30 receives a control signal from the control unit 20 and transmits the infrared rays S. However, the infrared-ray transmission/reception unit 30 may receive the infrared rays from an external device (for example, a remote controller) of the aerial display apparatus 1. The retroreflective member 14 and the display apparatus 15 correspond to a virtual image display unit that displays the display surface 10 as a virtual image in the air. The retroreflective member 14 is, for example, a retroreflective mirror fixed to an opening 2g located inside the front surface 2b of the housing 2.

The opening 2g is defined by, for example, a pair of first plate portions 2h constituting the front surface 2b of the housing 2 and a pair of second plate portions 2j fixed to the inside of the housing 2 of the first plate portions 2h. As an example, the first plate portion 2h and the second plate portion 2j are provided as a pair of upper and lower plates. The retroreflective member 14 is fixed to the housing 2 in a state of being interposed between the first plate portion 2h and the second plate portion 2j.

The retroreflective member 14 has, for example, a rectangular shape having long sides extending in the left-right direction D2 and short sides extending in the up-down direction D1. Each of one long side and the other long side of the retroreflective member 14 is interposed between the first plate portion 2h and the second plate portion 2j. The display apparatus 15 is obliquely arranged with respect to the retroreflective member 14.

As an example, the display apparatus 15 is a liquid crystal display (LCD). The display apparatus 15 is arranged obliquely above the retroreflective member 14 inside the housing 2. The display apparatus 15 has a screen 15b for displaying images. The screen 15b irradiates, for example, the retroreflective member 14 with the light C as an image obliquely downward. The retroreflective member 14 internally reflects the light C from the display apparatus 15 multiple times (for example, twice) and forms an image of the display surface 10 in a space on the front side of the retroreflective member 14 when viewed from the operator.

The sensor 12 may be exposed to, for example, the main surface 3b of the projecting portion 3. As an example, the sensor 12 is a depth sensor. For example, the sensor 12 is provided on a virtual straight line extending from the switch 11, that is, in a front position of the switch 11, which is a virtual image. The sensor 12 acquires distance image data including information on the position (two-dimensional position) of the target object F on a plane perpendicular to the virtual straight line and information on a distance K from the sensor 12 to the target object F. The sensor 12 acquires, for example, distance image data. For example, the sensor 12 outputs the acquired distance image data to the control unit 20 at a predetermined period (for example, 1/30 seconds).

As a specific example, the sensor 12 irradiates each point on an object existing within an imaging area including the target object F with light rays (or infrared rays) and receives the light rays reflected from each point on the object. The sensor 12 measures the distance between the sensor 12 and each point on the object based on the received light rays and outputs the measured distance for each pixel. The distance between the sensor 12 and each point on the object may be measured by, for example, a light coding method.

In the light coding method, the sensor 12 irradiates each point on an object existing within the imaging area including the target object F with a light rays in a random dot pattern. The sensor 12 measures the distance between sensor 12 and each point on the object by receiving the light rays reflected from each point on the object and detecting distortions in the pattern of the reflected light rays. The sensor 12 detects two-dimensional position information of each point on the object and distance information from the sensor 12 to each point on the object as a plurality of pixels and outputs the detected plurality of pixels to the control unit 20.

The control unit 20 is configured to be capable of communicating with each of the sensor 12, the display apparatus 15, and the infrared-ray transmission/reception unit 30. The control unit 20 includes, for example, a CPU (central processing unit) that executes programs, a storage unit including a ROM (read only memory) and a RAM (random access memory), an input/output unit, and a driver. Each function of the control unit 20 is realized by operating the input/output unit under the control of the CPU to read or write data in the storage unit. The form and arrangement location of the control unit 20 are not particularly limited.

Figure 4:
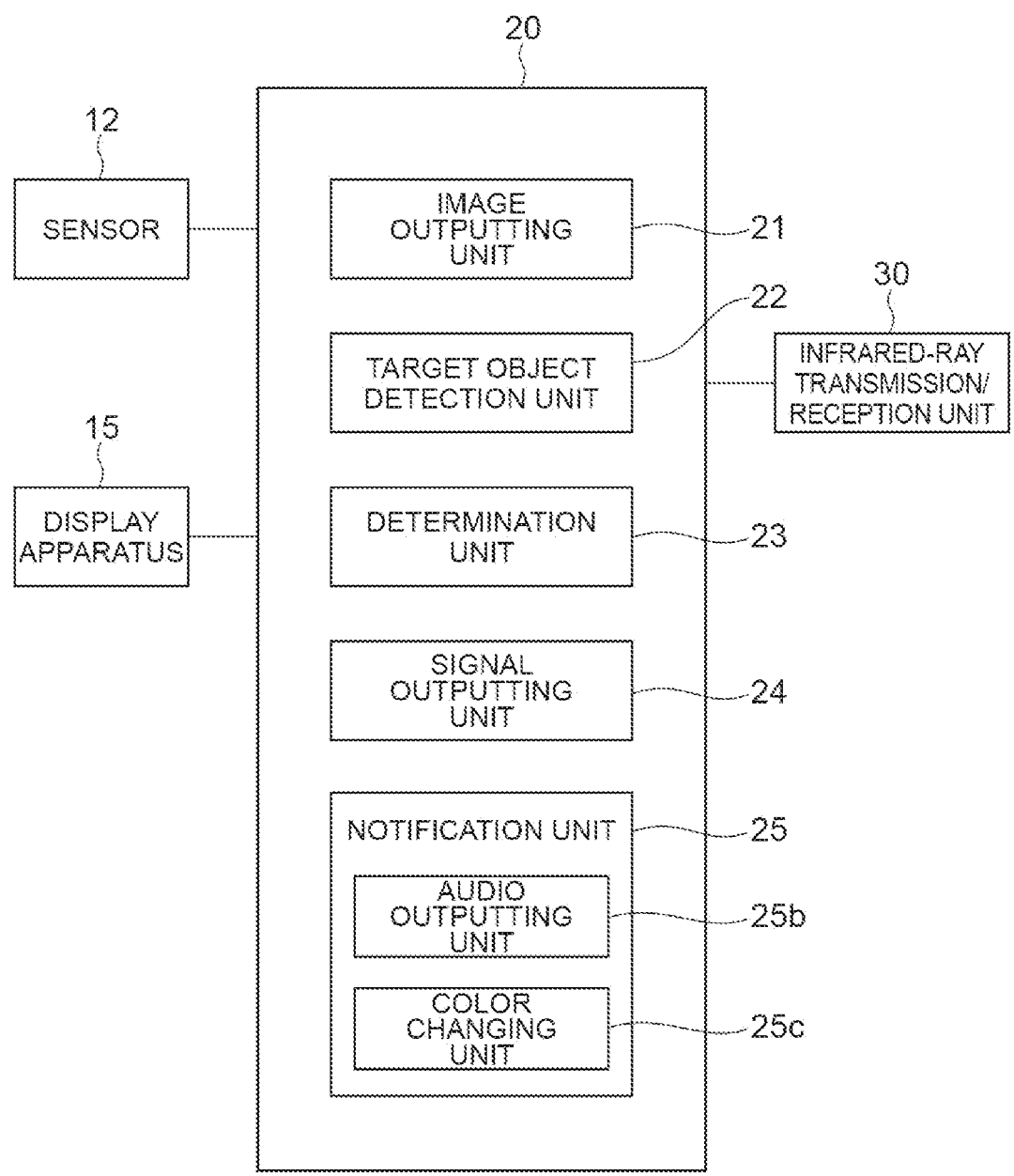
FIG. 4 is a block diagram illustrating functions of the aerial display apparatus according to the embodiment.

FIG. 4 is a functional block diagram of the control unit 20. As illustrated in FIGS. 3 and 4, the control unit 20 includes, as functional components, an image outputting unit 21, a target object detection unit 22, a determination unit 23, a signal outputting unit 24, and a notification unit 25. The image outputting unit 21 outputs control signals of the image data of the image to be displayed on the display apparatus 15 to the display apparatus 15. The display apparatus 15 can display various types of images based on the control signals of the image data from the image outputting unit 21.

The target object detection unit 22 detects the target object F based on the distance image data output from the sensor 12. When the target object F is detected, the target object detection unit 22 outputs position data indicating a position of the target object F to the determination unit 23. The determination unit 23 determines whether the switch 11 is pressed by the target object F based on the position data output from the target object detection unit 22.

Specifically, the determination unit 23 determines whether the distance K between the sensor 12 and the target object F is a threshold value Y or less. When it is determined that the distance K is a threshold value Y or less, the determination unit 23 determines that the target object F has reached a virtual pressing determination plane Z and the switch 11 is depressed. For example, the determination unit 23 generates an operation signal indicating that the switch 11 is operated when determining that the switch 11 is pressed.

A pressing determination plane Z is a virtual plane formed at a site where the distance from the sensor 12 is constant. For example, the pressing determination plane Z is provided at a close position of the switch 11. The position of the pressing determination plane Z may match the position of the switch 11 or may be at a position separated from the switch 11 by a predetermined position. In this embodiment, the position of the pressing determination plane Z matches the position of the switch 11.

The notification unit 25 receives an operation signal from the determination unit 23 when the determination unit 23 determines that the switch 11 is pressed. The notification unit 25 is a notification means for notifying the operator that the switch 11 is operated when the determination unit 23 determines that the switch 11 is operated. The notification unit 25 has, for example, an audio outputting unit 25b and a color changing unit 25c.

As an example, the audio outputting unit 25b is a speaker, and outputs audio when the operation signal is received from the determination unit 23. By hearing the audio from the audio outputting unit 25b, the operator can recognize that the switch 11 is operated. The color changing unit 25c generates a color changing signal, for example, when the operation signal from the determination unit 23 is received. The color changing unit 25c outputs a color changing signal to the display apparatus 15.

Upon receiving the color changing signal from the color changing unit 25c, the display apparatus 15 changes, for example, the color of the switch 11 pressed by the operator. The operator visually recognizes that the color of the switch 11 is changed, and thus, the operator can grasp that the switch 11 is operated. The display apparatus 15 may change the color of portions other than the switch 11 when the color changing signal from the color changing unit 25c is received.

By providing the notification unit 25 described above, the operator can grasp that the switch 11 is operated. However, in the notification unit 25, at least one of the audio outputting unit 25b and the color changing unit 25c may be omitted. The notification unit 25 may notify the operator that the switch 11 is operated in a manner different from the audio output by the audio outputting unit 25b or the color change by the color changing unit 25c.

The signal outputting unit 24 generates a control signal based on the pressing operation of the switch 11 when the determination unit 23 determines that the pressing operation of the switch 11 is performed. The signal outputting unit 24 transmits the generated control signal to the infrared-ray transmission/reception unit 30. Upon receiving the control signal, the infrared-ray transmission/reception unit 30 operates an external device of the aerial display apparatus 1.

The infrared-ray transmission/reception unit 30 as an example is a device control unit that controls an external device of the aerial display apparatus 1 by transmitting the infrared rays S used as data through the retroreflective member 14. The infrared-ray transmission/reception unit 30 may operate, for example, any one of the toilet bowl B attached with a washlet (refer to FIG. 1), each portion of the washlet, and the washstand M. As an example, the infrared-ray transmission/reception unit 30 may allow the toilet bowl B to clean the toilet bowl when the switch 11 corresponding to toilet bowl cleaning is pressed. Thus, in the example of aerial display apparatus 1, each portion of the toilet T can be operated by operating the switch 11 displayed as a virtual image. Therefore, since a button or the like for the operation of each portion of the toilet T needs not to be directly (physically) pressed, the operation can be realized hygienically.

The infrared rays S transmitted by the infrared-ray transmission/reception unit 30 are used for data communication. The infrared-ray transmission/reception unit 30 is provided, for example, inside the housing 2 on the opposite side of the operator when viewed from the retroreflective member 14. The infrared-ray transmission/reception unit 30 irradiates the retroreflective member 14 that displays the virtual image with the infrared rays S. The infrared rays S with which the retroreflective member 14 is irradiated are retroreflected by the retroreflective member 14.

For example, the infrared-ray transmission/reception unit 30 irradiates with the infrared rays S in a direction intersecting with the light C irradiated by the display apparatus 15. As an example, the infrared-ray transmission/reception unit 30 is arranged obliquely below the retroreflective member 14 inside the housing 2. In this case, the infrared-ray transmission/reception unit 30 is provided below the display apparatus 15 and irradiates with the infrared rays S obliquely upward. However, the position of the infrared-ray transmission/reception unit 30 and the direction in which the infrared-ray transmission/reception unit 30 irradiates with the infrared rays S are not particularly limited.

The infrared rays S from the infrared-ray transmission/reception unit 30 pass through the retroreflective member 14 in the same manner as the light C from the display apparatus 15. For example, the housing 2 is not provided with a dedicated opening for passing the infrared rays S. That is, in this embodiment, the opening 2g of the housing 2 is shared for passing the infrared rays S, and for passing the light C.

The retroreflective member 14 internally reflects the infrared rays S from the infrared-ray transmission/reception unit 30 multiple times (for example, twice) and forms an image of the infrared-ray transmission/reception unit X in the space on the front side of the retroreflective member 14 when viewed from the operator. The infrared rays S are, for example, an infrared-ray remote control code (infrared rays for remote control) for operating an external device of the aerial display apparatus 1.

When the infrared-ray transmission/reception unit 30 is arranged on one side (inside of the housing 2) when viewed from the retroreflective member 14, the infrared-ray transmission/reception unit X is optically arranged on the other side (outside of the housing 2) in plane symmetry. By facing the infrared-ray transmission/reception unit X toward, for example, each portion of the toilet T (toilet bowl B as an example), each portion of the toilet T can be irradiated with the infrared-ray remote control code.

Next, the function and effect of the aerial display apparatus 1 according to this embodiment will be described. In the aerial display apparatus 1, the display apparatus 15 irradiates the retroreflective member 14 with the light C to display a virtual image in the air. The infrared-ray transmission/reception unit 30 transmits and receives the infrared rays S used as data through the retroreflective member 14. The display apparatus 15 and the infrared-ray transmission/reception unit 30 are arranged inside the housing 2. The retroreflective member 14 is mounted on the opening 2g of the housing 2. Therefore, the retroreflective member 14 mounted on the opening 2g of the housing 2 can be shared by the display apparatus 15 that irradiates with the light C to display information and the infrared-ray transmission/reception unit 30 that transmits and receives the infrared rays S for data communication.

The retroreflective member 14 can be shared both for the display apparatus 15 to display a virtual image and for the transmission and reception of infrared rays S. Therefore, since there is no need to form a window in the housing 2 separately from the opening 2g, the design of the housing 2 can be simplified, and an increase in the cost of manufacturing the housing 2 can be suppressed. By providing the control unit 20 for transmitting and receiving the control signals to and from each of the display apparatus 15 and the infrared-ray transmission/reception unit 30, the display of the virtual image by the display apparatus 15 and the transmission and reception of data by the infrared-ray transmission/reception unit 30 can be allowed to be linked.

In the aerial display apparatus 1 according to this embodiment, the retroreflective member 14 displays the display surface 10 attached with the switch 11 as a virtual image. The aerial display apparatus 1 includes the sensor 12 that detects the position of the target object F approaching the switch 11 and the determination unit 23 determines based on the position of the target object F detected by the sensor 12 whether the switch 11 is operated. The display apparatus 15 displays the display surface 10 attached with the switch 11 as a virtual image, and the sensor 12 detects the position of the target object F such as a finger approaching the switch 11. The determination unit 23 determines based on the position of the target object F whether the switch 11 is operated. Therefore, since it can be determined whether the switch 11 is operated by displaying the switch 11 as a virtual image in the air, the infrared rays S can be transmitted and received by the infrared-ray transmission/reception unit 30 in linkage with the operation of the switch 11.

In the aerial display apparatus 1 according to this embodiment, the infrared-ray transmission/reception unit 30 transmits the infrared rays S used as data through the retroreflective member 14 when the determination unit 23 determines that the switch 11 is operated. Therefore, since the infrared rays S as data are transmitted when the determination unit 23 determines that the switch 11 is operated, the operation of the switch 11 can be linked with the irradiation of the infrared rays S.

In the aerial display apparatus 1 according to the present embodiment, the infrared-ray transmission/reception unit 30 transmits the infrared rays S as an infrared-ray remote control code for operating an external device (each device of the toilet T as an example) located outside the aerial display apparatus 1. Therefore, the display of the virtual image by the display apparatus 15 and the transmission of the infrared-ray remote control code can be linked. The external device can be operated by transmitting the infrared-ray remote control code to the receiver of the external device.

Next, various Modified Examples of the aerial display apparatus according to the present disclosure will be described. It is noted that the present disclosure is not limited to the contents of Modified Examples described later. A portion of configurations of the aerial display apparatuses according to various Modified Examples described later overlaps with a portion of the configuration of the aerial display apparatus 1 described above, and thus, in the following, the description of the contents that overlap with the aerial display apparatus 1 will be omitted as appropriate. It is noted that, in FIGS. 5 to 9, some illustrations are simplified for easy understanding.

Figure 5:
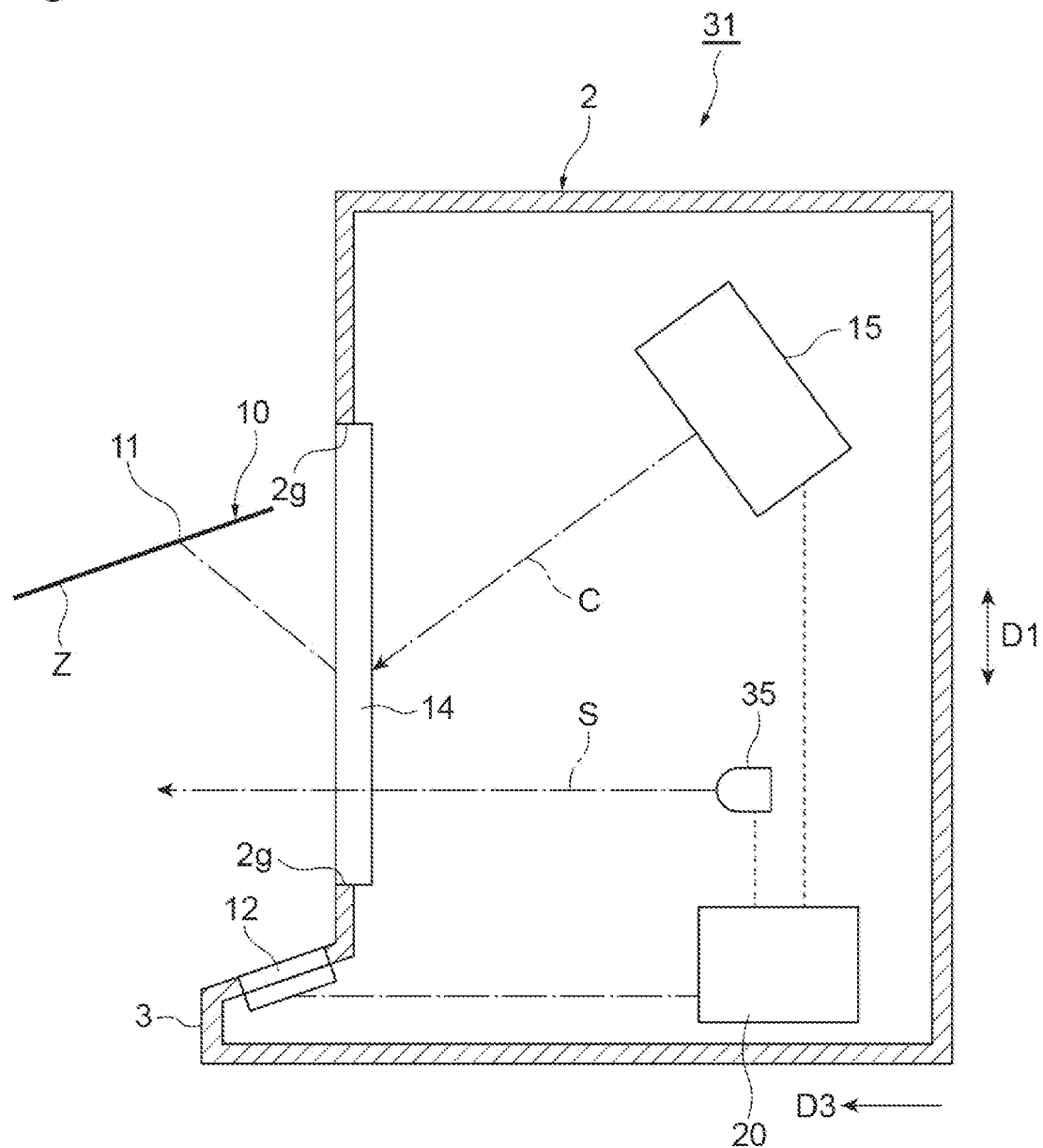
FIG. 5 is a longitudinal sectional view of an aerial display apparatus according to Modified Example.

The aerial display apparatus 31 illustrated in FIG. 5 is provided with an infrared-ray transmission/reception unit 35, and an irradiation direction of the infrared rays S by the infrared-ray transmission/reception unit 35 is different from that of the aerial display apparatus 1. The infrared-ray transmission/reception unit 35 irradiates with the infrared rays S perpendicularly to the retroreflective member 14. The infrared rays S from the infrared-ray transmission/reception unit 35 pass through the retroreflective member 14 and are transmitted to the outside of the aerial display apparatus 31.

The retroreflective member 14 transmits the infrared rays S as it is without retroreflecting the infrared rays S incident perpendicularly to the retroreflective member 14. In general, since the infrared rays S have high directivity, when the infrared rays S are irradiated perpendicularly to the retroreflective member 14, the infrared rays S can be transmitted through the retroreflective member 14 without being diffused and retroreflected. Therefore, it is possible to irradiate the retroreflective member 14 with the infrared rays S of which intensity is concentrated in the vertical direction so as to have high directivity.

Figure 6:
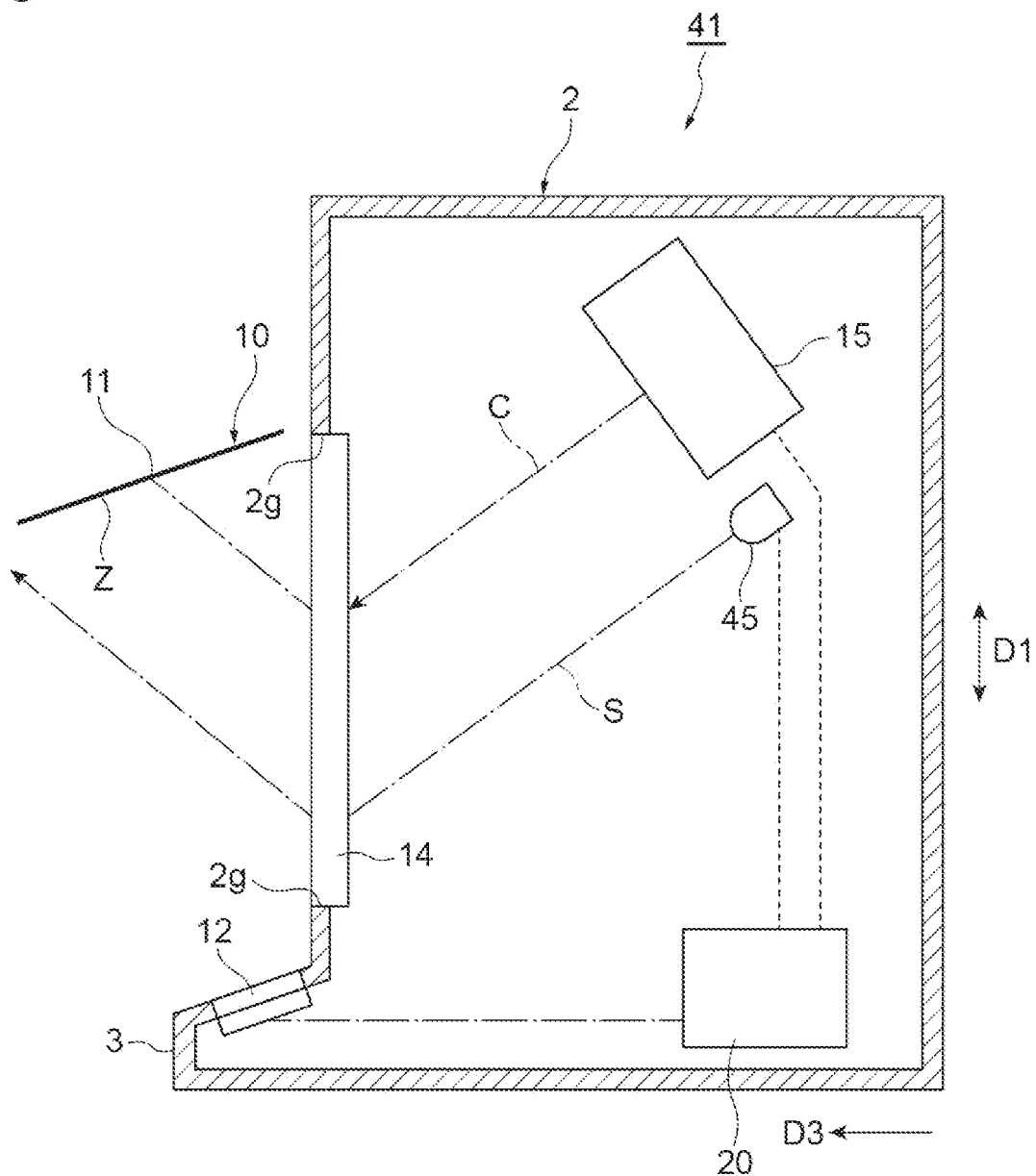
FIG. 6 is a longitudinal sectional view of an aerial display apparatus according to Modified Example.

As illustrated in FIG. 6, the aerial display apparatus 41 according to Modified Example includes an infrared-ray transmission/reception unit 45. For example, the infrared-ray transmission/reception unit 45 is arranged adjacent to the display apparatus 15 and irradiates with the infrared rays S along the light C of the display apparatus 15. The infrared-ray transmission/reception unit 45 irradiates with the infrared rays S, for example, obliquely downward toward the retroreflective member 14. In this case, since the infrared rays S can be irradiated obliquely upward from the retroreflective member 14, the infrared rays S can be transmitted, for example, in a direction of the ceiling.

Figure 7:
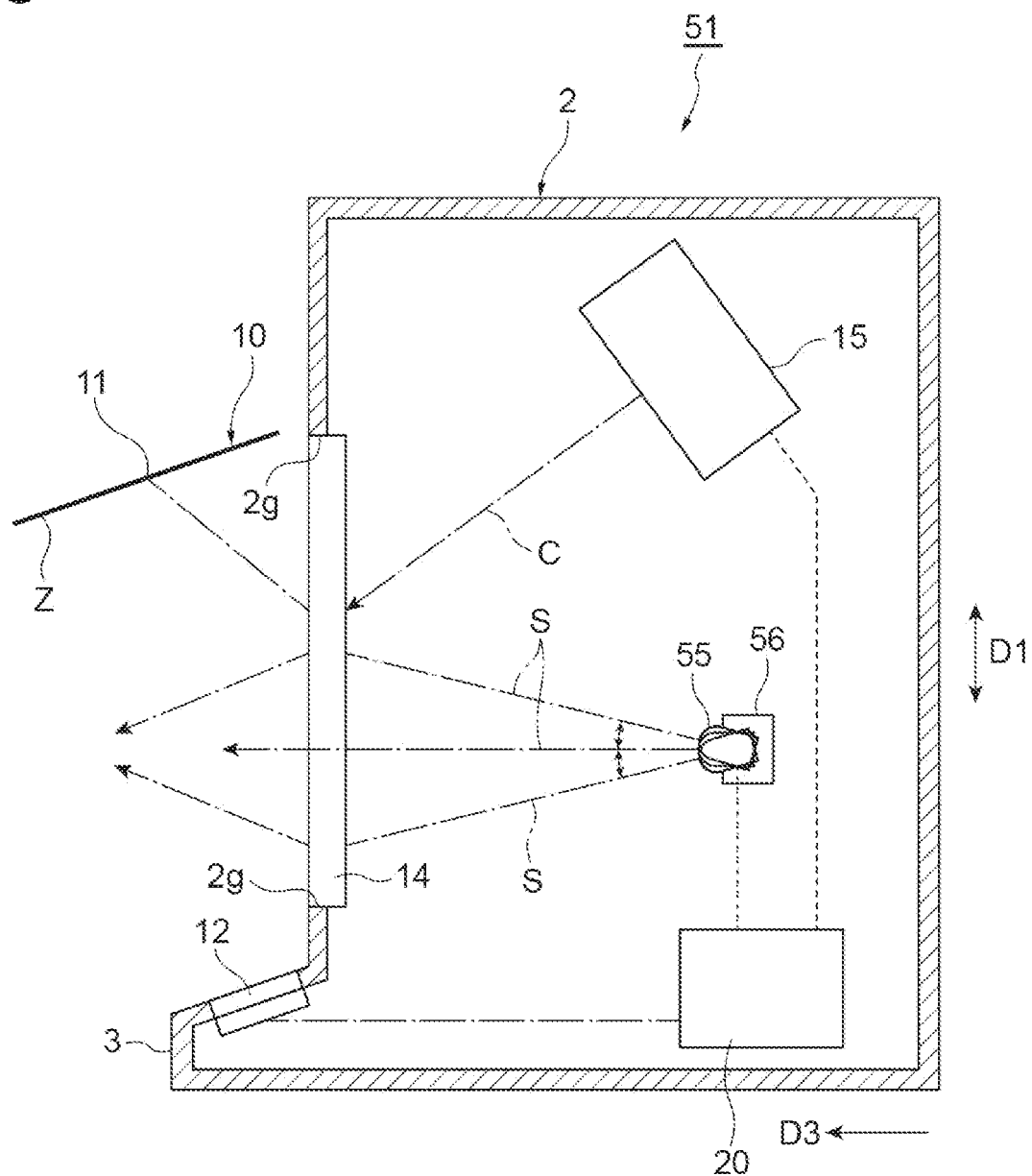
FIG. 7 is a longitudinal sectional view of an aerial display apparatus according to Modified Example.

As illustrated in FIG. 7, the aerial display apparatus 51 according to Modified Example includes an infrared-ray transmission/reception unit 55 and a switching unit 56 switching the direction in which the infrared-ray transmission/reception unit 55 irradiates with the infrared rays S. As an example, the switching unit 56 is fixed to the inner surface of the housing 2, and the infrared-ray transmission/reception unit 55 is fixed to the switching unit 56 so as to be swingable in the up-down direction.

As described above, in the aerial display apparatus 51 according to Modified Example, the infrared-ray transmission/reception unit 55 irradiates with the infrared rays S used as data through the retroreflective member 14, and the infrared-ray transmission/reception unit 55 includes the switching unit 56 switching the direction of irradiating with the infrared rays S. Therefore, the direction of the infrared rays S transmitted by the infrared-ray transmission/reception unit 55 can be switched to a desired direction by the switching unit 56. As a result, it is possible to switch the position of the infrared rays S to be transmitted and to achieve both retroreflection and transmission of the infrared rays S.

Figure 8:
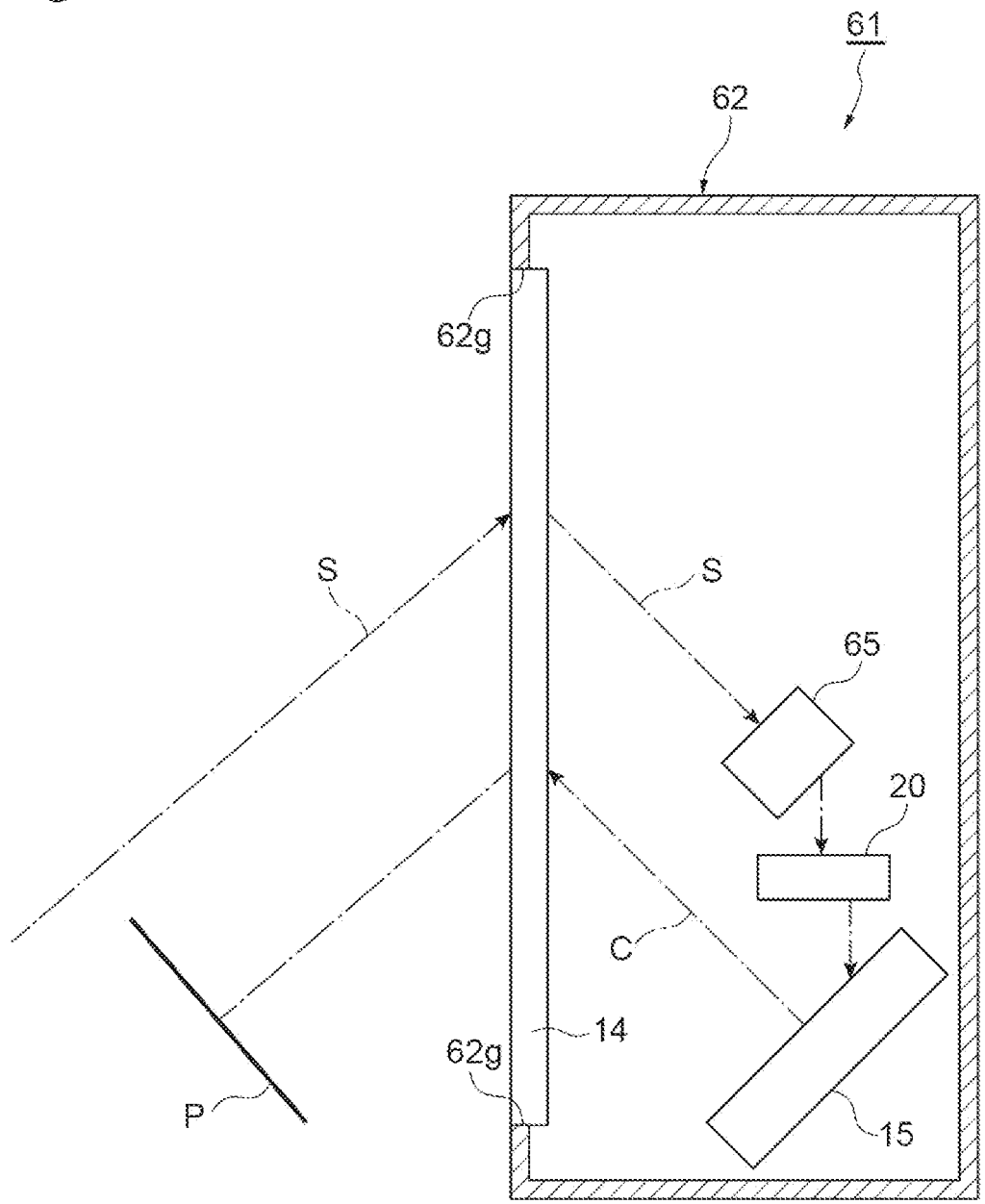
FIG. 8 is a longitudinal sectional view of an aerial display apparatus according to Modified Example.

In an aerial display apparatus 61 illustrated in FIG. 8, an infrared-ray transmission/reception unit 65 functions as a receiver for receiving the infrared rays S. As an example, the aerial display apparatus 61 is a digital signage having a housing 62 attached with an opening 62g. The infrared-ray transmission/reception unit 65 receives the infrared rays S from an external device of the aerial display apparatus 61 through the retroreflective member 14. In the aerial display apparatus 61, the infrared rays S are, for example, image data of an image P (virtual image) displayed by the aerial display apparatus 61.

When the infrared-ray transmission/reception unit 65 receives the infrared rays S, the image data is output from the infrared-ray transmission/reception unit 65 to the control unit 20 as a control signal. The control unit 20 outputs the image data to the display apparatus 15 as a control signal. By allowing the display apparatus 15 to irradiate the retroreflective member 14 with the light C of the image data, the retroreflective member 14 displays the image P of the image data as a virtual image.

As described above, in the aerial display apparatus 61, the infrared-ray transmission/reception unit 65 receives the infrared rays S from the external device through the retroreflective member 14, the control unit 20 outputs the image data to the display apparatus 15, and the display apparatus 15 irradiates the retroreflective member 14 with the light C of the image P of the image data. Therefore, the retroreflective member 14 can display the image P of the image data as a virtual image. For example, even if the aerial display apparatus 61 is located at a high place and hard to reach, the image P can be easily displayed by transmitting the infrared rays S to the aerial display apparatus 61 from a remote location.

Figure 9:
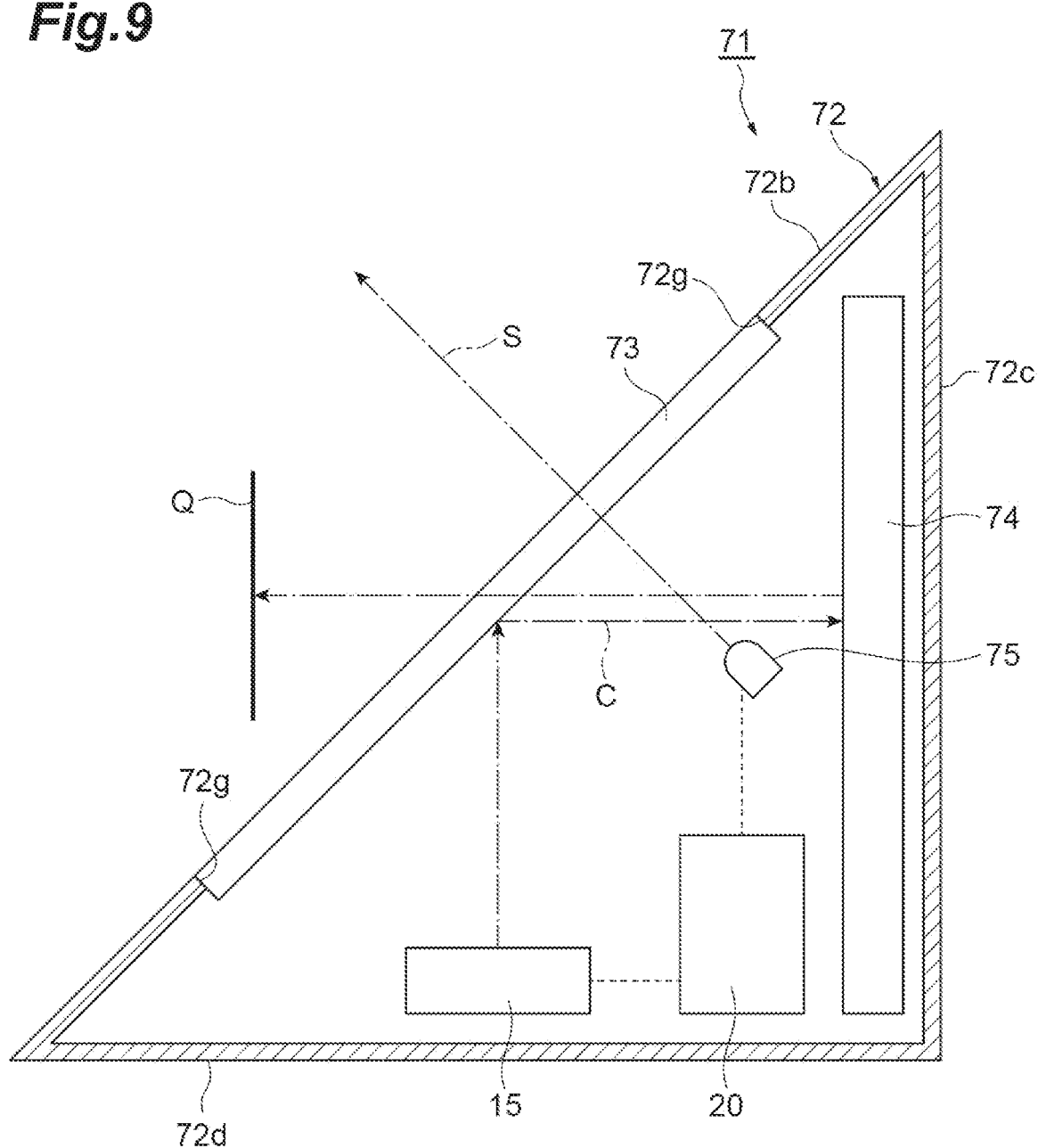
FIG. 9 is a longitudinal sectional view of an aerial display apparatus according to Modified Example.

As illustrated in FIG. 9, an aerial display apparatus 71 according to Modified Example includes a housing 72 having a shape different from that of the housing 2, a beam splitter 73, a retroreflective member 74, and an infrared-ray transmission/reception unit 75. The housing 72 has an opening 72g which the beam splitter 73 is mounted on. The housing 72 has an inclined surface 72b formed with the opening 72g, a side surface 72c extending downward from the upper end of the inclined surface 72b, and a bottom surface 72d extending between the side surface 72c and the inclined surface 72b. As an example, in a side sectional view, the housing 72 has a right triangular shape with the inclined surface 72b as an oblique side.

The retroreflective member 74 and the infrared-ray transmission/reception unit 75 are arranged inside the housing 72. The beam splitter 73 is irradiated with the light C from the display apparatus 15. The beam splitter 73 reflects the light C from the display apparatus 15 toward the retroreflective member 74. The retroreflective member 74 displays a virtual image Q outside the housing 72 by receiving the light C from the beam splitter 73.

In some cases, the housing 72 having a shape different from that of the housing 2 may be used like the aerial display apparatus 71, and the retroreflective member 74 and the infrared-ray transmission/reception unit 75 may be arranged inside the housing 72. Even in such a case, since the infrared-ray transmission/reception unit 75 irradiates with the infrared rays S in response to the control signal from the control unit 20, the same function and effect as the aerial display apparatus 1 or the like described above can be obtained.

Heretofore, the embodiments and Modified Examples of the aerial display apparatus according to the present disclosure are described above. However, the aerial display apparatus according to the present disclosure is not limited to the above-described embodiments or Modified Examples. The aerial display apparatus according to the present disclosure may be modified or applied to others within the scope of not changing the spirit described in each claim. The configuration, shape, size, number, material, and layout of each component of the aerial display apparatus can be changed as appropriate without changing the spirit described above.

As described above, in the present disclosure, the arrangement position of the infrared-ray transmission/reception unit and the irradiation direction of the infrared rays are not particularly limited, and can be changed as appropriate. In FIG. 7, the example where the infrared-ray transmission/reception unit 55 is fixed to the switching unit 56 so as to be swingable in the up-down direction is described. However, in the aerial display apparatus according to the present disclosure, the direction in which the infrared-ray transmission/reception unit swings is not limited to the up-down direction, may be, for example, a 360° direction, and can be changed as appropriate.

For example, in the above embodiment, the example where the sensor 12 measures the distance between the sensor 12 and each point on the object by using the light coding method. However, the method of the sensor 12 is not limited to the above method. For example, the sensor 12 may measure the distance between the sensor 12 and each point on the object by a TOF (Time Of Flight) method. In the TOF method, the sensor 12 calculates a flight time (delay time) of the light rays until the light rays reach the sensor 12 after being reflected at each point on the object, and the distance between the sensor 12 and each point on the object is measured from the calculated flight time and the speed of light. Even with such a form, the same effect as the above-described embodiment can be obtained. Furthermore, the type of the sensor is not limited to the depth sensor. An infrared-ray sensor, an ultrasonic sensor, or the like may be provided instead of the sensor 12, which is a depth sensor, and the type of the sensor can be changed as appropriate.

In the above-described embodiment, the example where a plurality of switches 11 are arranged to be aligned in a horizontal direction in the lower portion, and the retroreflective member 14 and the display apparatus 15 display the display surface 10 on which the character information 13 is displayed above the switches 11 is described. However, the layout of switches and the like on the display surface is not limited to the above example and can be changed as appropriate. Furthermore, the aerial display apparatus may be a device other than the operation input device that displays the display surface 10 with the switch 11, and may be the above-described digital signage or the like. Therefore, the aerial display apparatus according to the present disclosure can be applied to various devices that display virtual images in the air.

REFERENCE SIGNS LIST 1, 31, 41, 51, 61, 71: aerial display apparatus, 2, 72: housing, 2b: front surface, 2c: side surface, 2d: upper surface, 2f: lower surface, 2g: opening, 2h: first plate portion, 2j: second plate portion, 3: projecting portion, 3b: main surface, 3c: end surface, 3d: back surface, 10: display surface, 10b: center, 11: switch, 11b: center, 12: sensor, 13: character information, 14, 74: retroreflective member, 15: display apparatus, 15b: screen, 20: control unit, 21: image outputting unit, 22: target object detection unit, 23: determination unit, 24: signal outputting unit, 25: notification unit, 25b: audio outputting unit, 25c: color changing unit, 30, 45, 55, 65, 75: infrared-ray transmission/reception unit, 56: switching unit, 72b: inclined surface, 72c: side surface, 72d: bottom surface, 72g: opening, 73: beam splitter, B: toilet bowl, C: light, D1: up-down direction, D2: left-right direction, D3: projecting direction, E: toilet paper, F: target object, K: distance, M: washstand, P: image, Q: virtual image, S: infrared rays, T: toilet, V: reference line, W: wall portion, X: infrared-ray transmission/reception unit, Y: threshold value, Z: pressing determination plane.

The invention claimed is:

1. An aerial display apparatus displaying a virtual image in the air, comprising:
   a display apparatus irradiating with light to display information,
   a retroreflective member reflecting the light from the display apparatus multiple times to display a virtual image in the air;
   an infrared-ray transmission/reception unit transmitting and receiving infrared rays used as data through the retroreflective member;
   a control unit transmitting and receiving a control signal to and from each of the display apparatus and the infrared-ray transmission/reception unit; and
   a housing accommodating the display apparatus and the infrared-ray transmission/reception unit,
   wherein the retroreflective member is mounted on an opening formed in the housing, and
   wherein the display apparatus and the infrared-ray transmission/reception unit are arranged inside the housing.

2. The aerial display apparatus according to claim 1,
   wherein the retroreflective member displays a display surface attached with a switch as a virtual image, and
   wherein the aerial display apparatus includes:
   a sensor detecting a position of a target object approaching the switch; and
   a determination unit determining based on a position of the target object detected by the sensor whether the switch is operated.

3. The aerial display apparatus according to claim 2, wherein, when the determination unit determines that the switch is operated, the infrared-ray transmission/reception unit transmits the infrared rays used as data through the retroreflective member.

4. The aerial display apparatus according to claim 1,
   wherein the infrared-ray transmission/reception unit irradiates with the infrared rays used as data through the retroreflective member, and
   wherein the infrared-ray transmission/reception unit is provided with a switching unit switching a direction in which the infrared rays are irradiated.

5. The aerial display apparatus according to claim 1, wherein the infrared-ray transmission/reception unit transmits the infrared rays as an infrared-ray remote control code for operating an external device located outside the aerial display apparatus.

* * * * *